US006959395B2

(12) United States Patent
Ma

(10) Patent No.: US 6,959,395 B2
(45) Date of Patent: Oct. 25, 2005

(54) METHOD AND APPARATUS FOR THE CONDITIONAL ENABLEMENT OF PCI POWER MANAGEMENT

(75) Inventor: Kenneth Ma, Cupertino, CA (US)

(73) Assignee: Broadcom Corporation, Irvine, CA (US)

(*) Notice: Subject to any disclaimer, the term of this patent is extended or adjusted under 35 U.S.C. 154(b) by 542 days.

(21) Appl. No.: 10/180,148

(22) Filed: Jun. 26, 2002

(65) Prior Publication Data

US 2004/0003297 A1 Jan. 1, 2004

(51) Int. Cl.[7] .............................. G06F 1/26; G06F 5/06; G06F 1/28
(52) U.S. Cl. ...................... 713/310; 713/601; 713/322
(58) Field of Search ............................... 713/601, 322, 713/310; 710/8, 60

(56) References Cited

U.S. PATENT DOCUMENTS

| 5,600,839 | A | * | 2/1997 | MacDonald | ................ 713/322 |
| 5,625,807 | A | * | 4/1997 | Lee et al. | ................... 713/601 |
| 5,678,065 | A | * | 10/1997 | Lee et al. | ...................... 710/60 |
| 5,799,203 | A | * | 8/1998 | Lee et al. | ...................... 710/8 |
| 6,353,885 | B1 | * | 3/2002 | Herzi et al. | ..................... 713/1 |
| 6,572,384 | B1 | * | 6/2003 | Marchevsky | ................ 439/43 |

OTHER PUBLICATIONS

J. Scott Gardner, "PC Motherboard Technology", available at http://www.extremetech.com.*

Charles Kozierok, "Extended System Configuration Data", Apr. 17, 2001, http://www.pcguide.com/ref/mbsys/res/pnpESCD-c.html.*

Mark Russinovich, "Inside the Windows NT Registry", Apr. 1997, http://www.windowsitpro.com/Articles/Print.cfm?ArticleID=122.*

PCI Special Interest Group, "PCI Local Bus Specification Revision 2.2", Dec. 18, 1998, http://www.pcisig.com, pp. 189-193, "Chapter 6 Configuration Space".*

Shrishail Rana, "Mystery Behind Windows Registry", 2001, http://www.systweak.com/winreg/wr1.htm.*

PCI Special Interest Group, *"PCI Mobile Design Guide, Version 1.1"* (Dec. 18, 1998).

Compaq, Intel, Microsoft, Phoenix and Toshiba—*"Advanced Configuration and Power Interface Specification, Revision 2.0"* (Jul. 27, 2000).

* cited by examiner

*Primary Examiner*—Thomas Lee
*Assistant Examiner*—Ji H. Bae
(74) *Attorney, Agent, or Firm*—McAndrews, Held & Malloy

(57) ABSTRACT

A method and apparatus are disclosed for conditionally enabling/disabling PCI power management in a computer-based system employing a central resource and an operating system. Non-CLKRUN# compatible PCI devices in the system are identified and whether or not the non-CLKRUN# compatible PCI devices are enabled is determined. The CLKRUN# support capability of the central resource, if available, is enabled or disabled based on, at least in part, the established status of the non-CLKRUN# compatible PCI devices. If enabled, PCI power management is provided by the CLKRUN# support capability according to the PCI CLKRUN# protocol for all CLKRUN# compatible PCI devices present in the computer-based system.

22 Claims, 2 Drawing Sheets

METHOD AND APPARATUS FOR THE CONDITIONAL ENABLEMENT OF PCI POWER MANAGEMENT

BACKGROUND OF THE INVENTION

In a computer-based system, such as a desktop PC for example, peripheral component interconnect (PCI) devices are often part of the system. PCI devices are peripheral devices such as an Ethernet controller, audio controller, IEEE 1394 controller, cardbus controller, and SCSI controller.

A CPU is the computing and control hardware element of a computer-based system. In a personal computer, for example, the CPU is usually an integrated part of a single, extremely powerful microprocessor. An operating system is the software responsible for allocating system resources including memory, processor time, disk space, and peripheral devices such as printers, modems, and monitors. All applications use the operating system to gain access to the resources as necessary. The operating system is the first program loaded into the computer as it boots up, and it remains in memory throughout the computing session.

Some PCI devices may be on-board devices (devices on the motherboard of the computer-based system). For example, many computer-based systems have a SCSI or Ethernet controller on the motherboard. Other PCI devices are add-in devices that are plugged into PCI card slots within the computer-based system.

Most logic devices today use synchronous or clocked implementations. Power management schemes are often used to minimize the number of unnecessary state transitions since any change of state in a semiconductor device consumes power.

One power management scheme called clock control may involve slowing the device clock or stopping the clock altogether. In a PCI environment, the clock run (CLKRUN#) protocol (i.e. CLKRUN# support capability) may be used to achieve clock control. A central resource (e.g. a Southbridge) in the computer-based system is typically used as the clock controller to control the modulation of a PCI clock and to monitor and drive the CLKRUN# line to implement the PCI clock run protocol.

An example of power control of a PCI device is the control of a graphics controller. A graphics controller consumes significant power and, therefore, turning the graphics controller off saves substantial power and also puts the monitor in a power savings mode. In certain systems, the diskette motor is controlled by a BIOS (basic input/output system). In a PC, a BIOS is a set of instructions that configures the hardware and starts the loading process of the operating system when the PC is first powered up.

The BIOS may also perform PCI enumeration at system boot time. The BIOS instructs a PCI bus driver to scan the PCI bus for PCI devices. When a PCI device is found on the PCI bus, a registry is searched for a corresponding instance key or template. A best match is searched for using device identifiers such as "class", "subclass", "vendor ID", etc. If enabled, the PCI device is configured for use during run time. Otherwise, the device may be disabled and powered down.

In a PCI environment, CLKRUN# is an optional signal that may be used to request starting, stopping, slowing down, or speeding up the PCI clock for PCI devices within the system. CLKRUN# also indicates the status of the PCI clock. For PCI devices, CLKRUN# is an open drain output and also an input. For the central resource (provider of the PCI clock), CLKRUN# is a sustained tri-state I/O signal. The central resource is responsible for maintaining CLKRUN# in the asserted state and for driving CLKRUN# to the de-asserted state.

There are three main states in the PCI clock run protocol. They are:
  Clock running—the PCI clock is running and the PCI bus is operational.
  About to stop/slow down—the central resource has indicated on the CLKRUN# line that the PCI clock is about to stop or slow down.
  Clock stopped/slowed—the PCI clocked is stopped or slowed, with CLKRUN# being monitored for a restart.

The central resource drives CLKRUN# low while the PCI clock is running at a normal operating frequency. Before slowing down the PCI clock to a non-operational frequency or stopping the PCI clock, the central resource drives CLKRUN# high and tri-states its driver. PCI devices are required to maintain their states while the PCI clock is stopped or the clock rate is changed.

A PCI device may assert the CLKRUN# signal to request the central resource to restore the PCI clock to a normal operating frequency. After detecting the assertion of CLKRUN#, the central resource starts the PCI clock if the PCI clock was stopped, or brings the PCI clock to a normal operating frequency if the PCI clock was just slowed.

When the PCI clock is slowed or stopped by use of CLKRUN#, power savings are achieved. According to the PCI clock run protocol, all CLKRUN# lines of all PCI devices are tied together. Therefore, all CLKRUN# compatible PCI devices will be powered down at the same time. All PCI devices must acknowledge to the central resource that they are ready to be powered down before the central resource may power down the PCI devices.

It has not been a requirement, however, that PCI devices be compatible with the CLKRUN# protocol. Particularly, add-in PCI cards to PCI slots are not compatible with the CLKRUN# protocol. Certain on-board PCI devices such as a SCSI controller, for example, may not be compatible with the CLKRUN# protocol.

As a result, if a PCI environment of a computer-based system is such that there are some CLKRUN# compatible PCI devices and some non-CLKRUN# compatible PCI devices on the PCI bus that all require use of the PCI clock, then the CLKRUN# protocol may not be used to slow or stop the PCI clock unless the non-CLKRUN# PCI devices are disabled. Therefore, in many desk-top systems, for example, that have PCI card slots, PCI device power management is not performed. It is not centrally known by the central resource which PCI devices are present and which PCI devices are enabled or active, and the CLKRUN# protocol is not linked to PCI device state to provide PCI power management as a function of the state of the PCI environment.

Further limitations and disadvantages of conventional and traditional approaches will become apparent to one of skill in the art, through comparison of such systems with embodiments of the present invention as set forth in the remainder of the present application with reference to the drawings.

BRIEF SUMMARY OF THE INVENTION

Certain embodiments of the present invention provide a method and apparatus to enhance PCI power management in a computer-based system. In particular, certain embodiments conditionally enable or disable PCI power management in a computer-based system using CLKRUN# support capability.

An embodiment of the present invention provides for powering down all CLKRUN# compatible PCI devices in a computer-based system employing a central resource and an operating system. Determinations of whether or not various PCI devices are present and enabled are made and all CLKRUN# compatible PCI devices are conditionally powered down based on, at least in part, the previous determinations.

A method of the present invention provides for determining if a central resource of a computer-based system includes CLKRUN# support capability. The method also determines if any non-CLKRUN# compatible PCI devices are present and, if so, whether or not the non-CLKRUN# compatible PCI devices are enabled. The CLKRUN# support capability is conditionally enabled or disabled based on, at least in part, the previous determinations.

Apparatus of the present invention provides, in a computer-based system, a central resource. A central resource configuration module is also provided to determine if the central resource provides CLKRUN# support capability. An enumeration and decision module is further provided to determine if there are any non-CLKRUN# compatible PCI devices present and enabled in the computer-based system. The central resource configuration module also conditionally enables or disables the CLKRUN# support capability.

Certain embodiments of the present invention afford an approach to perform enhanced PCI device power management in a computer-based system using, in part, the PCI CLKRUN# protocol.

These and other advantages and novel features of the present invention, as well as details of an illustrated embodiment thereof, will be more fully understood from the following description and drawings.

DETAILED DESCRIPTION OF THE INVENTION

Figure 1:
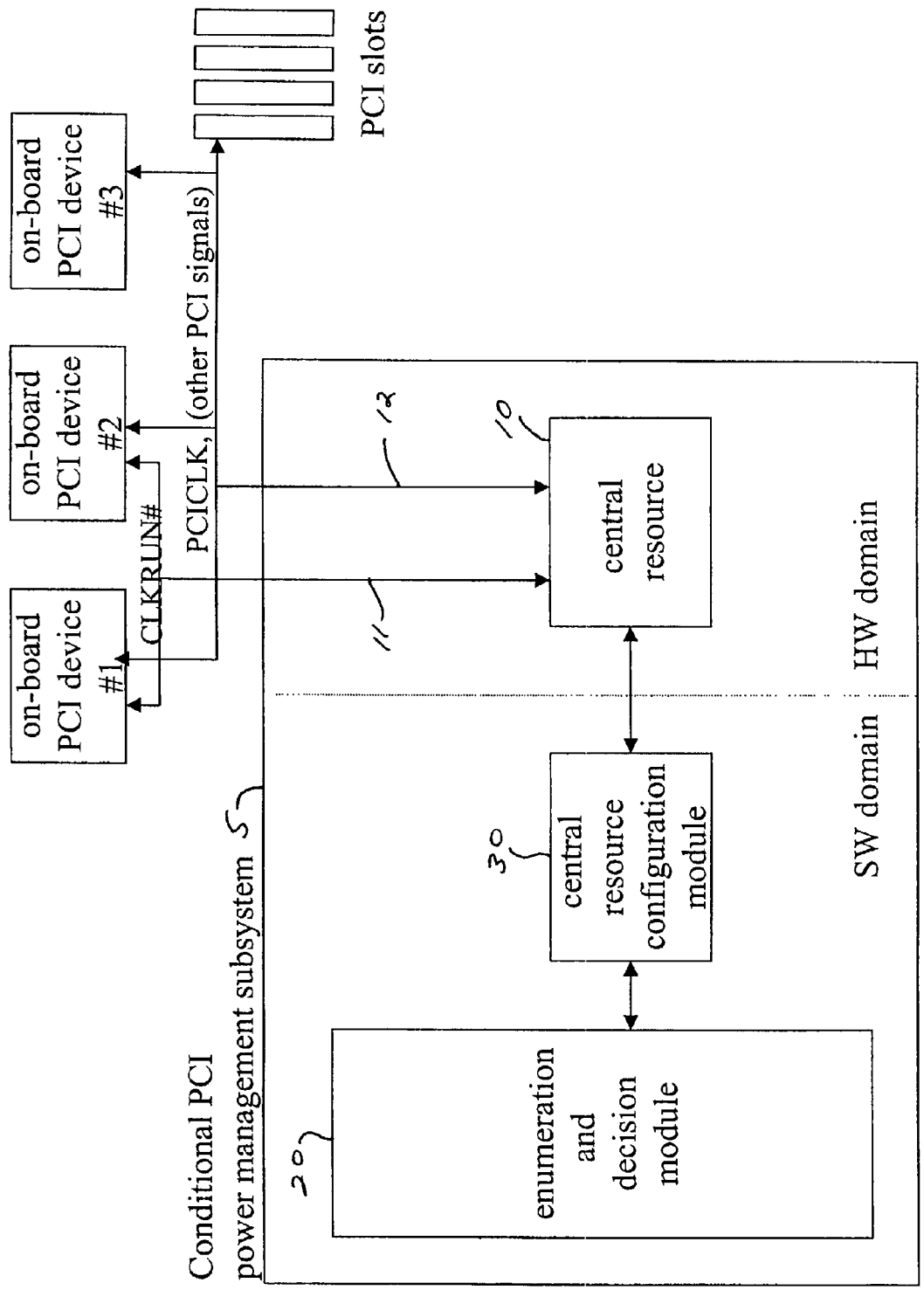
FIG. 1 is a schematic block diagram of an apparatus for conditionally enabling/disabling PCI power management in a computer-based system in accordance with an embodiment of the present invention.

FIG. 1 is a schematic block diagram of a conditional PCI power management subsystem 5 for conditionally enabling/disabling PCI power management in a computer-based system in accordance with an embodiment of the present invention. Conditional PCI power management subsystem 5 comprises a central resource 10, an enumeration and decision module 20, and a central resource configuration module 30.

Figure 2:
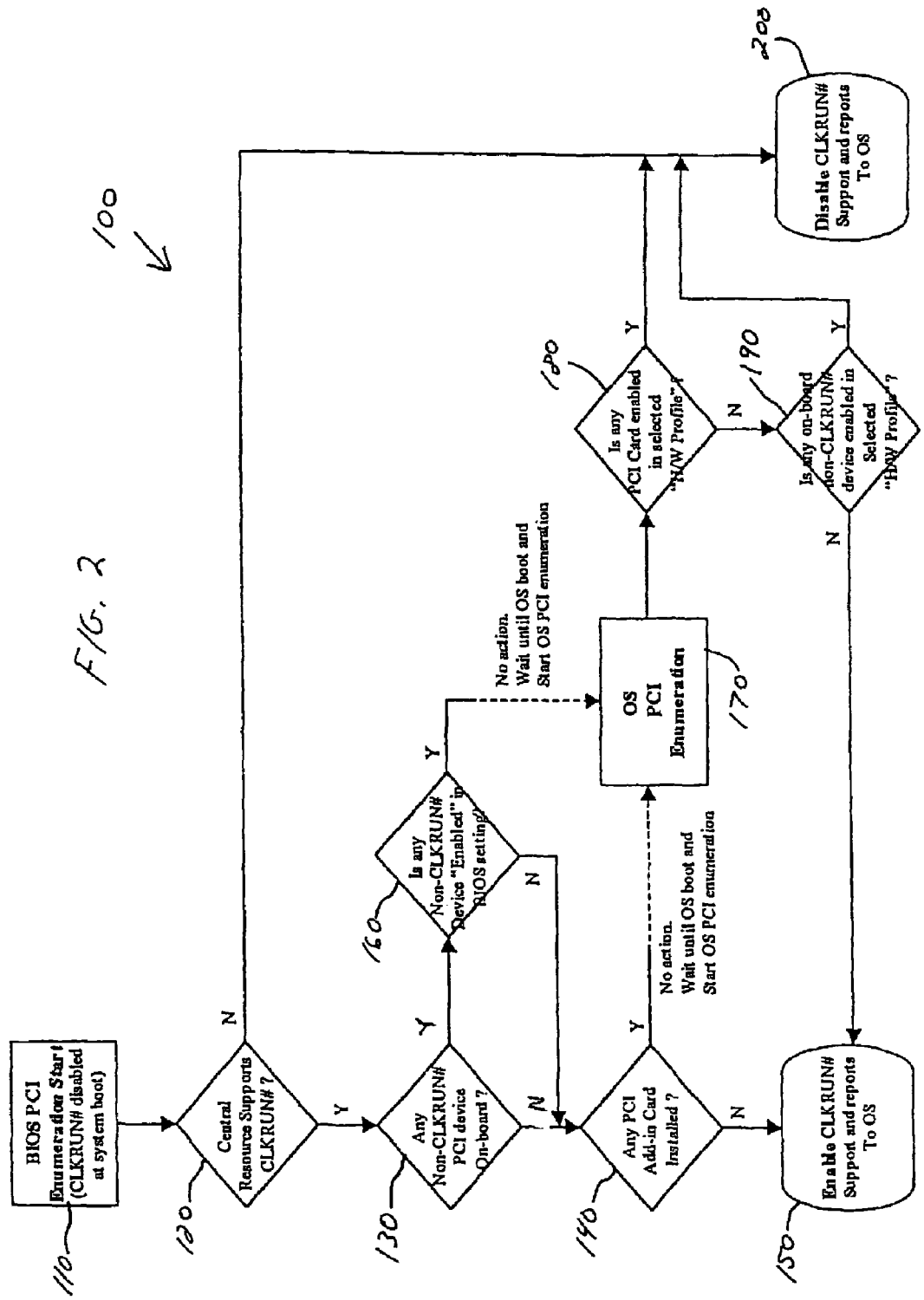
FIG. 2 is a flowchart of a method for conditionally enabling/disabling PCI power management in a computer-based system using the apparatus in FIG. 1 in accordance with an embodiment of the present invention.

FIG. 2 is a flowchart of a method 100 for conditionally enabling/disabling PCI power management in a computer-based system using the apparatus in FIG. 1 in accordance with an embodiment of the present invention.

Referring to FIG. 1, the conditional PCI power management subsystem 5 interfaces to any on-board and/or slotted PCI devices present in the computer-based system. A PCI clock (PCICLK) and other PCI signals 12 comprise the interface. Also, if the central resource provides CLKRUN# support capability, a CLKRUN# line 11 is included in the interface. The CLKRUN# line ties all of the CLKRUN# compatible PCI devices together with the central resource. Therefore, the CLKRUN# line powers down all PCI devices, that are CLKRUN# compatible, at the same time according to the PCI CLKRUN# protocol.

In an embodiment of the present invention, the central resource 10 comprises a Southbridge. A Southbridge is a chipset that manages the typical input/output (I/O) such as Universal Serial Bus (USB), serial, audio, integrated drive electronics (IDE), and PCI bus in a computer-based system. The Southbridge also provides the PCI-related signals including CLKRUN# 11 and PCICLK 12.

The central resource 10 interfaces to the central resource configuration module 30 which interfaces to the enumeration and decision module 20 to form the conditional PCI power management subsystem 5. The central resource configuration module 30 interacts with the enumeration and decision module 20 to identify if any PCI devices are present and enabled in the computer-based system. The central resource configuration module 30 uses the PCI status information to enable or disable CLKRUN# support capability in the central resource 10 according to the method 100.

In an embodiment of the present invention, the central resource 10 exists in a hardware domain of the conditional PCI power management subsystem 5 and the central resource configuration module 30 and the enumeration and decision module 20 exist in a software domain of the conditional PCI power management subsystem 5.

Referring to FIG. 2, in accordance with an embodiment of the present invention, when the computer-based system is first powered up, CLKRUN# support capability is disabled. The enumeration and decision module 20 performs PCI enumeration (step 110) during system boot time. The enumeration and decision module 20 instructs a PCI bus driver to scan the PCI bus for PCI devices. When a PCI device is found on the PCI bus, a registry is searched for a corresponding instance key or template. A best match is searched for using device identifiers such as "class", "subclass", "vendor ID", etc. Subsequently, the PCI device is configured for use during run time. Otherwise, the device may be disabled and powered down.

In step 120, the central resource configuration module 30 determines if the central resource 10 provides CLKRUN# support capability. If so, then in step 130, the enumeration and decision module 20 determines if any non-CLKRUN# compatible on-board PCI devices are present in the computer-based system based, at least in part, on the results of the PCI enumeration performed in step 110. In step 160, the enumeration and decision module 20 determines if any non-CLKRUN# compatible PCI devices are enabled in the BIOS setting. If there are any non-CLKRUN# compatible PCI devices on-board but they are not enabled, then, in step 140, the enumeration and decision module 20 determines if any PCI add-in cards are installed in the PCI slots of the computer-based system. If not, then the central resource configuration module 30 enables CLKRUN# support capability in the central resource 10.

If there are any non-CLKRUN# compatible PCI devices enabled in the BIOS setting as determined in step 160 by the enumeration and decision module 20, then the conditional PCI power management subsystem 5 waits until operating system (OS) boot time and then the enumeration and decision module 20 performs PCI enumeration in step 170. Also, if there are add-in PCI cards installed in the computer-based system as determined in step 140 by the enumeration and decision module 20, then the conditional PCI power management subsystem 5 waits until operating system (OS) boot time and then the enumeration and decision module 20 performs PCI enumeration in step 170.

Once the enumeration and decision module 20 finishes performing PCI enumeration, enumeration and decision module 20 determines, in step 180, if any of the installed PCI cards are now enabled. If any of the PCI cards are enabled, then the central resource configuration module 30 disables the CLKRUN# support capability in the central resource 10 in step 200. If none of the PCI cards are enabled, then the enumeration and decision module 20 determines if any on-board non-CLKRUN# compatible PCI devices are enabled in step 190. If not, then the central resource configuration module 30 enables the CLKRUN# support capability in the central resource 10 in step 150. If any on-board non-CLKRUN# compatible PCI devices are enabled, then the central resource configuration module 30 disables the CLKRUN# support capability in the central resource 10 in step 200.

As a result, the CLKRUN# support capability is conditionally enabled or disabled. When the CLKRUN# support capability is enabled, the central resource 10 may power down (by stopping or slowing the PCI clock 12) the PCI devices according to the PCI CLKRUN# protocol. All enabled PCI devices must be powered down at the same time. Therefore, power savings are achieved in a more effective manner because the presence and status of any CLKRUN# compatible and non-CLKRUN# compatible PCI devices has been taken into consideration.

As an alternative embodiment of the present invention, the enumeration and decision module 20 may direct the operating system to disable certain PCI devices such that PCI power management using the CLKRUN# protocol may be enabled in the central resource 10. For example, if there is a SCSI controller on the motherboard of the computer-based system (i.e. an on-board PCI device) but there is not a SCSI hard drive in the system, then the enumeration and decision module 20 may direct the operating system to disable the SCSI controller in order to save power. In other words, if no SCSI hard drive is present, there is no need to have the SCSI controller powered up.

The various elements of the conditional PCI power management subsystem 5 may be combined or separated according to various embodiments of the present invention. For example, in an embodiment of the present invention, the enumeration and decision module 20 may be separated into a BIOS PCI support module and an OS PCI support module to separately perform the various conditional PCI power management functions associated with the BIOS and the OS of the computer-based system.

Also, the various modules may be implemented as various combinations of software and/or hardware modules. For example, in an embodiment of the present invention, the central resource configuration module 30 and the enumeration and decision module 20 may be software modules running on a dedicated hardware processor within the conditional PCI power management subsystem 5.

In summary, certain embodiments of the present invention afford an approach to conditionally enable/disable PCI power management according to the PCI CLKRUN# protocol in order to power down the CLKRUN# compatible PCI devices. As a result, PCI device power consumption may be more effectively reduced, particularly in desk-top systems.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a computer-based system employing an operating system (OS) and a central resource, a method for conditionally enabling PCI power management in said computer-based system, said method comprising:
   determining if said central resource of said computer-based system includes CLKRUN# support capability;
   determining if any non-CLKRUN# compatible PCI devices are present in said system;
   if any non-CLKRUN# compatible PCI devices are present, determining if any non-CLKRUN# compatible PCI devices are enabled in a BIOS setting in said system; and
   conditionally enabling or disabling said CLKRUN# support capability based, at least in part, on said determinings to provide said PCI power management for any CLKRUN# compatible PCI devices present in said system.

2. The method of claim 1 wherein said non-CLKRUN# compatible PCI devices comprise on-board PCI devices.

3. The method of claim 1 wherein said non-CLKRUN# compatible PCI devices comprise add-in PCI card devices.

4. The method of claim 1 wherein all hard-wired CLKRUN# signal lines are electrically tied together and all said CLKRUN# compatible PCI devices are powered down simultaneously if at all.

5. The method of claim 1 further comprising disabling said CLKRUN# support capability if one or more of said non-CLKRUN# PCI devices are enabled.

6. The method of claim 1 further comprising enabling said CLKRUN# support capability if all of said non-CLKRUN# PCI devices are disabled.

7. The method of claim 1 further comprising disabling at least one of said non-CLKRUN# PCI devices such that said CLKRUN# support capability may be enabled to provide said PCI power management of said CLKRUN# compatible PCI devices.

8. The method of claim 1 wherein said central resource comprises a Southbridge.

9. The method of claim 1 further comprising disabling said CLKRUN# support capability at system boot time of said system.

10. The method of claim 1 further comprising disabling said CLKRUN# support capability at operating system boot time of said system.

11. In a computer-based system employing an operating system (OS), apparatus for conditionally enabling PCI power management in said computer-based system, said apparatus comprising:
    a central resource;
    a central resource configuration module interfacing to said central resource and determining, at least in part if said central resource provides CLKRUN# support capability and conditionally enabling or disabling said CLKRUN# support capability;
    an enumeration and decision module interfacing to said central resource configuration module receive a BIOS setting and to determine, at least in part, if there are any non-CLKRUN# compatible PCI devices present, and if any non-CLKRUN# compatible PCI devices are present, to determine if there are any non-CLKRUN# compatible PCI devices enabled in said computer-based system.

12. The apparatus of claim 11 wherein said central resource provides said CLKRUN# support capability by controlling modulation of a PCI clock signal and by monitoring and driving a hard-wired CLKRUN# line to implement a PCI clocking protocol.

13. The apparatus of claim 11 wherein said non-CLKRUN# compatible PCI devices comprise on-board PCI devices.

14. The apparatus of claim 11 wherein said non-CLKRUN# compatible PCI devices comprise add-in PCI cards.

15. The apparatus of claim 11 wherein said central resource comprises a Southbridge.

16. The apparatus of claim 11 wherein a hard-wired CLKRUN# signal line ties together said central resource and all said CLKRUN# compatible PCI devices to power down all said CLKRUN# compatible PCI devices simultaneously if at all.

17. In a computer-based system employing an operating system (OS), apparatus for conditionally enabling PCI power management in said computer-based system, said apparatus comprising:
a PCI Bus driver for detecting a PCI device identification; and
a module for searching a registry of templates for the PCI device identification to determine, at least in part, if there are any non-CLKRUN# compatible PCI devices present, and if any non-CLKRUN# compatible PCI devices are present, to determine if there are any non-CLKRUN# compatible PCI devices enabled in said computer-based system.

18. The apparatus of claim 17 wherein the module instructs the PCI Bus driver to scan for the PCI device identification.

19. The apparatus of claim 17 wherein the PCI device identification comprises one or more device identifiers that are used for searching the registry of templates.

20. The apparatus of claim 17 wherein the module comprises an enumeration and decision module.

21. In a computer-based system employing an operating system (OS), apparatus for conditionally enabling PCI power management in said computer-based system, said apparatus comprising:
a central resource;
a central resource configuration module interfacing to said central resource and determining, at least in part, if said central resource provides CLKRUN# support capability and conditionally enabling or disabling said CLKRUN# support capability;
a module interfacing to said central resource configuration module to perform PCI enumeration and to determine, at least in part, if there are any non-CLKRUN# compatible PCI devices present, and if any non-CLKRUN# compatible PCI devices are present, to determine if there are any non-CLKRUN# compatible PCI devices enabled in said computer-based system.

22. The apparatus of claim 21 wherein the module comprises an enumeration and decision module.

* * * * *